: 2,920,078
Patented Jan. 5, 1960

2,920,078
STABILIZATION OF HETEROCYCLIC NITROGEN COMPOUNDS

Paul F. Warner, Phillips, and Jackie E. Duke, Borger, Tex., assignors to Phillips Petroleum Company, a corporation of Delaware No Drawing. Application August 1, 1957
Serial No. 675,533

16 Claims. (Cl. 260—283)

This invention relates to the stabilization of vinyl-substituted heterocyclic compounds having a hetero nitrogen atom. In another aspect of the invention, it relates to the stabilization of vinylpyridine compounds.

In the manufacture of vinylpyridines and other vinyl-substituted heterocyclic nitrogen compounds, one of the principal difficulties encountered is the tendency for these vinyl compounds to polymerize at ambient temperatures. This tendency is especially pronounced when they are subjected to elevated temperatures. These vinyl compounds are used as monomers in polymerization reactions, and the presence of soluble and/or insoluble polymers in the vinylpyridine monomers can prevent their use for this purpose. The problem reaches its peak when such vinyl compounds are processed in the presence of heat, for example, in the distillation of these compounds. Polymers are also formed at ambient temperatures when the vinylpyridine compounds are stored and transported. It becomes important, therefore, to provide an effective stabilizing agent which will inhibit the formation of both soluble and insoluble polymers in the vinylpyridine monomers.

Vinylpyridines can be prepared by the dehydrogenation of a corresponding alkylpyridine by a method disclosed in the copending application of John E. Mahan, Serial No. 244,469, filed August 30, 1951, now U.S. Patent No. 2,769,811, for "The Preparation of 2-Methyl-5-Vinylpyridine from 2-Methyl-5-Ethylpyridine." The effluent from this dehydrogenation reaction is separated in a combined steam and vacuum fractional distillation, and this separation has been found to be very difficult, not only due to the proximity of the boiling points of the major components, but also due to the tendency of the 2-methyl-5-vinylpyridine to polymerize. The effluent is subjected to heat in the range of 180° to 220° F. during this steam and vacuum distillation, and operation of this distillation step can become extremely difficult because of the formation of polymers unless a suitable stabilizing agent is used.

It is an object of this invention, therefore, to provide a method for inhibiting the polymerization of vinyl-substituted heterocyclic nitrogen compounds having a hetero nitrogen atom.

Another object of the invention is to provide a method for inhibiting the formation of both soluble and insoluble polymers in vinyl-substituted heterocyclic compounds having a hetero nitrogen atom.

A further object of the invention is to provide a method for preventing polymerization of vinylpyridines under conditions of fractional distillation.

Other and further objects of the invention will become apparent to those skilled in the art upon consideration of the following disclosure.

We have discovered that the aforementioned objects are obtained by adding to vinyl-substituted heterocyclic compounds having a hetero nitrogen atom, a polymerization inhibiting amount of at least one of certain xanthic sulfides. The xanthic sulfides, and mixtures thereof, which are effective inhibitors in accordance with this invention include compounds represented by the following structural formula:

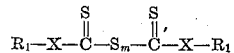

wherein each $R_1$ is individually selected from the group consisting of alkyl, alicyclic, aryl, aralkyl and alkaryl; X is a member selected from the group consisting of sulfur and oxygen; and $m$ is an integer from 2 to 7 inclusive. It is to be understood that the $R_1$ radicals can be the same or different radicals depending upon the method of preparation. The $R_1$ radicals may be, for example, methyl, ethyl, propyl, isopropyl, tert-butyl, amyl, hexyl, octyl, decyl, dodecyl, cyclohexyl, benzyl, phenyl, naphthyl, phenylethyl, p-tolyl, phenylhexyl, 2,4,6-triethylphenyl, and the like. Examples of, but not exhaustive of, xanthic sulfides which can be used as inhibitors in the practice of the instant invention include dimethylxanthogen trisulfide, dimethylxanthogen, hexasulfide, diethylxanthogen, disulfide, diethylxanthogen tetrasulfide, diethylxanthogen pentasulfide, diethylxanthogen heptasulfide, di-n-propylxanthogen trisulfide, di-n-propylxanthogen hexasulfide, diisopropylxanthogen pentasulfide, diisopropylxanthogen heptasulfide, di-tert-butylxanthogen trisulfide, dioctylxanthogen tetrasulfide, didodecylxanthogen trisulfide, dicyclohexylxanthogen pentasulfide, ethyl-tert-butylxanthogen tetrasulfide, methylethylxanthogen trisulfide, phenylbenzylxanthogen trisulfide, methylcyclohexylxanthogen tetrasulfide, dimethylthioxanthogen trisulfide, diethylthioxanthogen disulfide, diethylthioxanthogen tetrasulfide, diethylthioxanthogen pentasulfide, diethylthioxanthogen hexasulfide, di-n-propylthioxanthogen trisulfide, di-n-propylthioxanthogen hexasulfide, diisopropylthioxanthogen pentasulfide, diisopropylthioxanthogen heptasulfide, di-tert-butylthioxanthogen trisulfide, dioctylthioxanthogen tetrasulfide, didodecylthioxanthogen trisulfide, dicyclohexylthioxanthogen pentasulfide, ethyl-tert-butylthioxanthogen tetrasulfide, methylethylthioxanthogen trisulfide, phenylbenzylthioxanthogen trisulfide, methylcyclohexylthioxanthogen tetrasulfide, and the like.

Methods for preparing the above-described xanthic sulfides are described in the literature. For example, one method for the production of the organic xanthogen trisulfides is by the action of sulfur dichloride on a metal xanthate or a mixture of metal xanthates. The tetrasulfides can be obtained by the action of sulfur monochloride on a metal xanthate or a mixture of metal xanthates. In one specific method for preparing a material such as diethylxanthogen tetrasulfide, potassium hydroxide is dissolved in absolute alcohol and the required amount of carbon disulfide is added with cooling and mechanical agitation. Potassium xanthate, which precipitates out, is recovered by filtration and then dried after which it is suspended in an inert solvent, such as benzene. Thereafter, a benzene solution of sulfur monochloride is added while stirring and cooling. After addition of the sulfur chloride, the reaction mixture is refluxed in order to complete the condensation after which it is poured into water. The benzene layer is then removed and dried. After stripping off the benzene, the xanthogen tetrasulfide remains as a residue. The thioxanthogen tetrasulfide can be prepared by employing mercaptans instead of the alcohol for the preparation of the xanthate salt prior to condensation. The xanthic sulfides can also be prepared by heating the requisite amount of sulfur and xanthogen disulfide together at about 120° C. until a homogeneous liquid is produced. It is to be understood that it is not intended to limit the instant invention to any particular method for preparing the xanthic sulfides, for any suitable method described in the literature can be employed in their preparation.

As has been indicated above, the xanthic sulfides of this invention are effective in inhibiting the formation of both soluble and insoluble polymers in vinyl-substituted heterocyclic compounds having a hetero nitrogen atom. The insoluble polymer is also commonly known as "popcorn polymer" and is an insoluble, hard, porous, and opaque material. Popcorn polymer is aptly named because it resembles popcorn in appearance.

It is desired to point out that the terms "stabilizer," "inhibitor," or "inhibiting agent," as used herein, are intended to have essentially the same meaning and that they are used for essentially the same purposes, which is to designate the substances disclosed herein which prevent polymerization of the vinyl-substituted heterocyclic nitrogen compounds. It is not intended that these terms necessarily shall denote a mechanism by which the stabilizing action is accomplished.

The polymerizable heterocyclic nitrogen compounds which are inhibited against polymerization by a xanthic sulfide in accordance with this invention include the polymerizable heterocyclic nitrogen compounds of the pyridine and quinoline (including isoquinoline) series, especially the nuclear (ring) alkyl substituted derivatives thereof. These polymerizable heterocyclic nitrogen compounds include the

substituted nitrogen compounds, wherein R is a hydrogen atom or a hydrocarbyl (containing only carbon and hydrogen atoms) radical, preferably having not more than 12 carbon atoms. The vinyl-substituted bases, especially those containing only one substituent vinyl group, as well as the nuclear alkyl substituted derivatives are particularly applicable in the practice of this invention. It is preferred, however, that the total number of carbon atoms in the nuclear (ring) substituted alkyl group or groups be not more than twelve. In addition to the vinyl substituted heterocyclic nitrogen compounds the isopropenyl substituted compounds (i.e., a vinyl group having a methyl substituent in the alpha position) can also be inhibited. Typical heterocyclic nitrogen compounds which are applicable in the practice of this invention include the vinyl-substituted pyridines and the vinyl-substituted quinolines and isoquinolines. These compounds include the 2-vinylpyridines such as 2-vinylpyridine; 5-methyl-2-vinylpyridine; 5-ethyl-2-vinylpyridine, also the 5-vinylpyridines such as 5-vinylpyridine; 2-methyl-5-vinylpyridine, also the divinylpyridines such as 2,5-divinylpyridine; 3-methyl-2,5-divinylpyridine. Other compounds which are also applicable in the practice of this invention include 4-methyl-3-vinylpyridine; 2-isopropenylpyridine; 5-propyl-2-isopropenylpyridine; 2-octyl-5-vinylpyridine and the various polymerizable quinoline and isoquinoline compounds such as 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; 2,5,8-trivinylquinoline; 6,7-dimethyl-2,3-divinylquinoline, etc. Generally, and as indicated, any polymerizable, especially vinyl-substituted, pyridine, quinoline or isoquinoline is applicable in the practice of this invention.

The polymerizable heterocyclic nitrogen compounds to which this invention is especially applicable can also be conveniently defined as compounds selected from the group consisting of compounds having the following structural formulas:

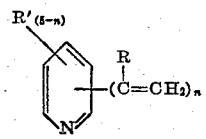 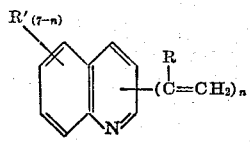

and

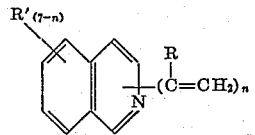

wherein $n$ is an integer selected from the group consisting of 1 and 2, R is selected from the group consisting of H, $CH_3$, and $C_2H_5$, and each R' is individually selected from the group consisting of H and an alkyl group, not more than 12 carbon atoms being present in the total of the R' groups.

The process of this invention is particularly applicable to mixtures containing substantial proportions of a vinylpyridine compound, i.e., that amount which causes difficulties due to its polymerization, e.g., over 50 percent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, and 5-amyl-2-vinylpyridine.

In carrying out the invention, solution of the stabilizing agent in the vinylpyridine, or other heterocyclic compound containing a hetero nitrogen atom to be stabilized, can be accomplished in any suitable manner, such as by agitating or stirring the mixture containing the stabilizing agent, or merely by allowing the mixture to stand. Ultimately, the decision as to what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. In the practice of this invention, a range of concentration from about 0.01 percent to 5.0 percent, or more, by weight of the xanthic sulfides disclosed herein will be employed, preferably from 0.1 percent to 1.0 percent, all percentages being based on the weight of the heterocyclic compound containing a hetero nitrogen atom to be stabilized. Furthermore, the amount will depend on which particular heterocyclic compound containing a hetero nitrogen atom is concerned.

A more comprehensive understanding of the invention may be obtained by reference to the following illustrative examples, which are not intended, however, to be unduly limitative of the invention.

EXAMPLE I

Tests were made in order to ascertain the effectiveness of diethylthioxanthogen tetrasulfide (DETXTS) as an inhibitor for popcorn polymer formation in 2-methyl-5-vinylpyridine (MVP). The DETXTS was prepared by reacting ethyl mercaptan, carbon disulfide, sodium hydroxide, and sulfur chloride. The reaction product had the following properties:

Refractive index 20/D _____ 1.7170
Specific gravity 20/20 _____ 1.3897
Total sulfur, wt. percent _____ 73.2
Molecular wt. _____ 241
Color _____ Orange-red Samples of flashed MVP were placed in vials, and to each sample there was added between 0.71 and 0.77 weight percent divinylbenzene concentrate, 0.5 ml. of water, a small piece of steel, a small piece of polymer seed, and the stated amount of inhibitor. Thirty-five percent of the volume of each vial was left empty to provide an air space. The control was prepared in the same manner except that no inhibitor was added. The vials were sealed with screw caps and then placed in an oven maintained at a temperature between 180 and 185° F. The samples were inspected periodically for popcorn polymer growth. The results of these tests are noted below in Table I.

Table 1

| Inhibitor Concentration, wt. percent | Hours for Popcorn Growth | |
|---|---|---|
| | Start | Complete |
| 0 (control) | 2 | 5 |
| 0.1 | 10 | 46 |
| 0.3 | 54 | 76 |
| 0.5 | 54 | 76 |
| 0.6 | 66 | 100 |

From the above data, it was calculated that DETXTS had an effectiveness index of 0.28. The effectiveness index is defined as the amount of inhibitor in weight percent which is required to give 50 hours complete protection against popcorn formation in samples stored at 180° F. The effectiveness index of DETXTS is to be compared with that of ditertiarybutyl polysulfide which has an average effectiveness index of 0.37.

EXAMPLE II

Tests were made to determine the effectiveness of diethylxanthogen disulfide (DEXTS) as an inhibitor for popcorn polymer formation in 2-methyl-5-vinylpyridine. Tests were also made using ditertiarybutyl polysulfide (TBPS) as an inhibitor in order to compare the effectiveness of the two materials.

The DEXTS was prepared by reacting sulfur dichloride and the alkali xanthate. Soltrol 170, a mixture of highly branched paraffinic hydrocarbons, was used as the reaction diluent and as the solvent for the sulfur dichloride.

Samples of flashed MVP were placed in vials and to each sample there was added between 0.71 and 0.77 weight percent divinylbenzene concentrate, 0.5 ml. of water, a small piece of steel and the stated amount of inhibitor. (No polymer seed was added in this example.) Thirty-five percent of the volume of each vial was left empty to provide an air space. The control was prepared in the same manner except that no inhibitor was added. The vials were sealed with screw caps and then placed in an oven maintained at a temperature between 180 and 185° F. The samples were inspected periodically for "popcorn" polymer growth. The results of the tests are set forth hereinbelow in Table II.

Table II

| Inhibitor | | Hours for Popcorn Growth | |
|---|---|---|---|
| Type | Conc., wt. percent | Initial growth | Complete polymerization |
| None (control) | 0.000 | | 7 |
| DEXTS | 0.155 | 42 | 68 |
| DEXTS | 0.462 | 89 | |
| TBPS | 0.156 | 31 | 38 |
| TBPS | 0.463 | 61 | 71 |

From the above data, it was calculated that DEXTS had an effectiveness index of 0.26 as compared with the effectiveness index of TBPS of 0.38 when tested under the same conditions.

When the xanthic sulfides are used as inhibitors in the distillation of the effluent from the dehydrogenation of 2-methyl-5-ethylpyridine to produce 2-methyl-5-vinylpyridine, the inhibitors can be added to the feed to the distillation column, at any point along the column or the inhibitor can be added to the reflux of the distillation column. It will be found that in some cases, a smaller amount of the inhibitor is effective when the inhibitor is added to the top of the column or to the column reflux.

It will be understood that the foregoing disclosure is illustrative of our invention and that other embodiments within the scope of the invention will occur to those skilled in the art. Those skilled in the art will appreciate, for instance, that for the purpose of this invention, vinyl-substituted heterocyclic compounds having a hetero nitrogen atom further substituted with non-interfering groups, for example, halo-, nitro-, amino-, hydroxyl-, and carboxyl-, are the same as non-substituted vinyl heterocyclic compounds having a hetero nitrogen atom.

We claim:

1. As a composition of matter, a compound selected from the group consisting of compounds having the following structural formulas:

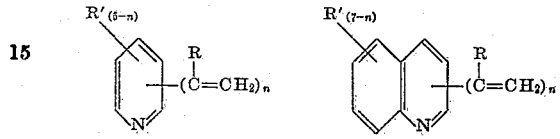

and

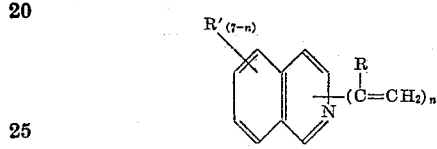

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of the R' groups; stabilized with a polymerization inhibiting amount of at least about 0.01 weight percent based on the weight of said heterocyclic nitrogen compound of at least one xanthic sulfide corresponding to the following structural formula:

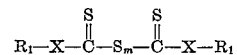

wherein each $R_1$ is individually selected from the group consisting of alkyl, alicyclic, aryl, aralkyl and alkaryl, X is a member selected from the group consisting of sulfur and oxygen, and $m$ is an integer from 2 to 7, inclusive.

2. A composition of matter according to claim 1 wherein said xanthic sulfide is diethylxanthogen trisulfide.

3. A composition of matter according to claim 1 wherein said xanthic sulfide is diethylthioxanthogen trisulfide.

4. A composition of matter according to claim 1 wherein said xanthic sulfide is diethylxanthogen tetrasulfide.

5. A composition of matter according to claim 1 wherein said xanthic sulfide is diethylthioxanhogen tetrasulfide.

6. A composition of matter according to claim 1 wherein said xanthic sulfide is diethylxanthogen pentasulfide.

7. A method for stabilizing a heterocyclic nitrogen compound selected from the group consisting of compounds having the following structural formulas:

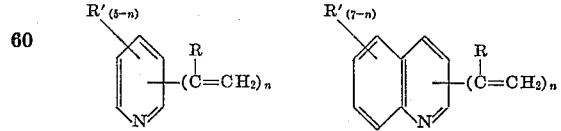

and

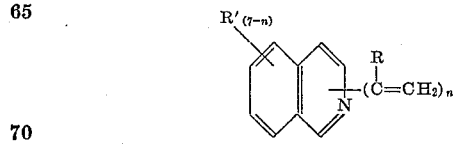

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of the R' groups; which comprises adding to said heterocyclic nitrogen compound a polymerization inhibiting amount of at least about 0.01 weight percent based on the weight of said heterocyclic nitrogen compound of at least one xanthic sulfide corresponding to the following structural formula:

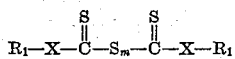

wherein each $R_1$ is individually selected from the group consisting of alkyl, alicyclic, aryl, aralkyl and alkaryl, X is a member selected from the group consisting of sulfur and oxygen, and $m$ is an integer from 2 to 7, inclusive.

8. The method according to claim 7 wherein said heterocyclic nitrogen compound is 2-methyl-5-vinylpyridine.

9. The method according to claim 7 wherein the amount of said xanthic sulfide added is from 0.01 to 5.0 weight percent, based on the weight of said heterocyclic nitrogen compound.

10. A method according to claim 7 wherein said xanthic sulfide is diethylxanthogen trisulfide.

11. A method according to claim 7 wherein said xanthic sulfide is diethylthioxanthogen trisulfide.

12. A method according to claim 7 wherein said xanthic sulfide is diethylxanthogen tetrasulfide.

13. A method according to claim 7 wherein said xanthic sulfide is diethylthioxanthogen tetrasulfide.

14. A method according to claim 7 wherein said xanthic sulfide is diethylxanthogen pentasulfide.

15. As a composition of matter 2-methyl-5-vinylpyridine stabilized with 0.1 to 1.0 percent diethylthioxanthogen tetrasulfide based on the weight of said pyridine.

16. As a composition of matter 2-methyl-5-vinylpyridine stabilized with 0.1 to 1.0 percent diethylxanthogen trisulfide based on the weight of said pyridine.

References Cited in the file of this patent
UNITED STATES PATENTS 2,775,594     Potts et al. _____ Dec. 25, 1956

OTHER REFERENCES

Moureu: Compt. rend., vol. 179 (1924), pp. 237–243.
Boudry et al.: Styrene, Reinhold, N.Y., 1952, pp. 21, 22 and 714.